United States Patent [19]

Carrioli et al.

[11] Patent Number: 5,437,517
[45] Date of Patent: Aug. 1, 1995

[54] METHOD FOR AUTOMATICALLY REPAIRING UNDERWATER PIPELINES, PARTICULARLY SUITABLE FOR GREAT DEPTHS, AND THE RELATIVE APPARATUS

[75] Inventors: Paolo Carrioli; Massimo Montesi, both of Ancona, Italy

[73] Assignee: Snamprogetti S.p.A., San Donato Milanese, Italy

[21] Appl. No.: 215,198

[22] Filed: Mar. 18, 1994

[30] Foreign Application Priority Data

Feb. 22, 1993 [IT] Italy .................... MI93A0535

[51] Int. Cl.$^6$ .................................. F16L 1/26
[52] U.S. Cl. ........................ 405/169; 405/173
[58] Field of Search ............... 405/154, 158, 166, 169, 405/170, 173, 188, 190, 191

[56] References Cited

U.S. PATENT DOCUMENTS

| | | | |
|---|---|---|---|
| 4,203,687 | 5/1980 | Sumner | 405/170 |
| 4,234,268 | 11/1980 | Scodino | 405/158 |
| 4,832,530 | 5/1989 | Andersen et al. | 405/170 |

FOREIGN PATENT DOCUMENTS

| | | |
|---|---|---|
| 1554807 | 10/1979 | United Kingdom . |
| 2040012 | 8/1980 | United Kingdom . |
| 2082721 | 3/1982 | United Kingdom . |

*Primary Examiner*—David H. Corbin
*Attorney, Agent, or Firm*—George P. Hoare, Jr.; Roger & Wells

[57] ABSTRACT

A method, using a crane-equipped depot ship, for automatically repairing an underwater pipeline even if installed at great depth, comprising substantially the following steps: cutting off the damaged pipe piece by a single working module which, lowered onto the sea bed by a crane and clamped about said pipeline, removably supports the cutting apparatus; removing the concrete from the facing ends of the cut pipeline by said single working module which removably supports the removal apparatus, this being provided with an expansion-centering head; installing connectors by a sonar head alignment apparatus removably supported by said working module; and installing the replacement pipe piece by said working module using a reference and guide apparatus clamped about said ends of the pipeline. Specific apparatus for implementing the method are also described.

5 Claims, 14 Drawing Sheets

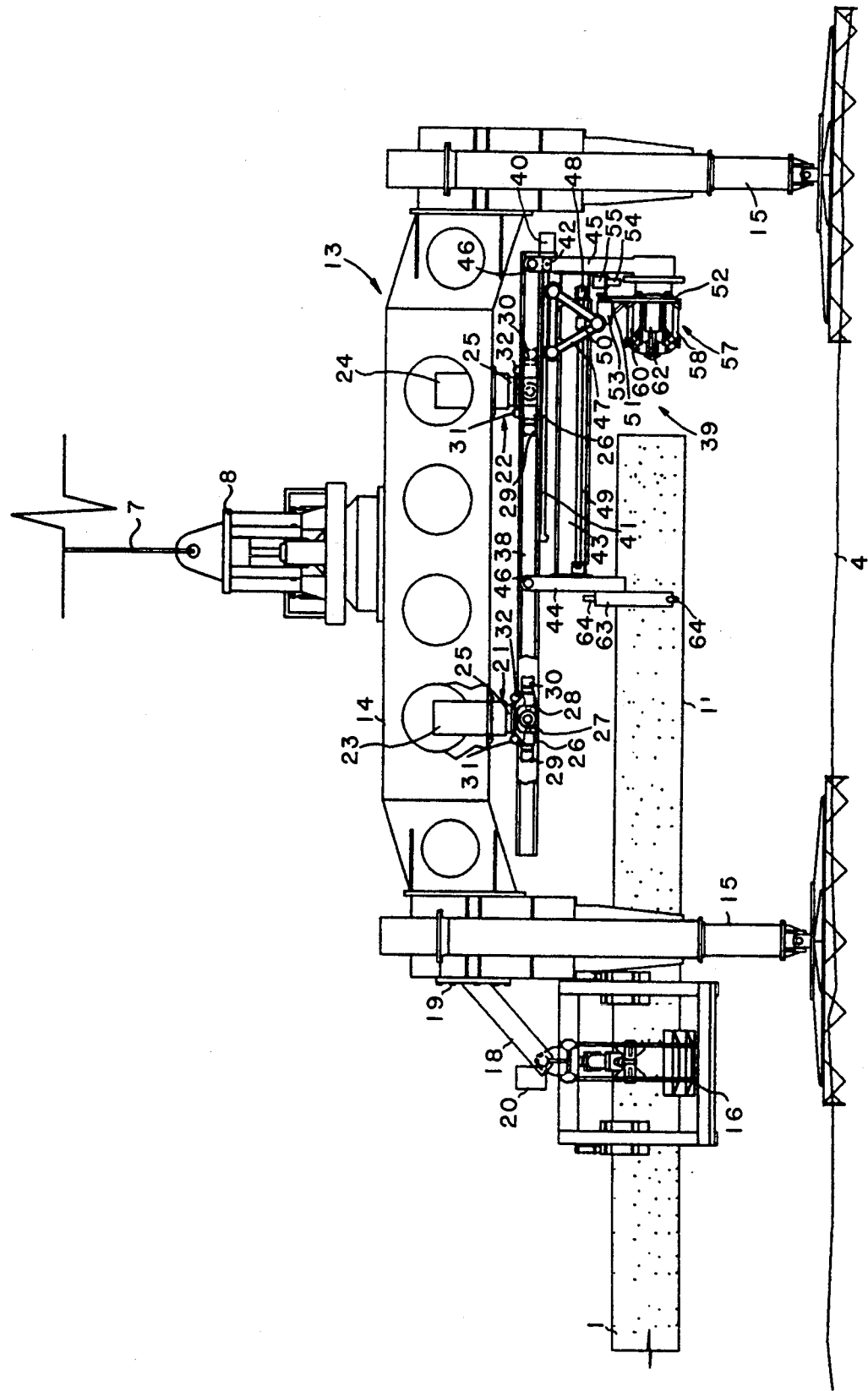

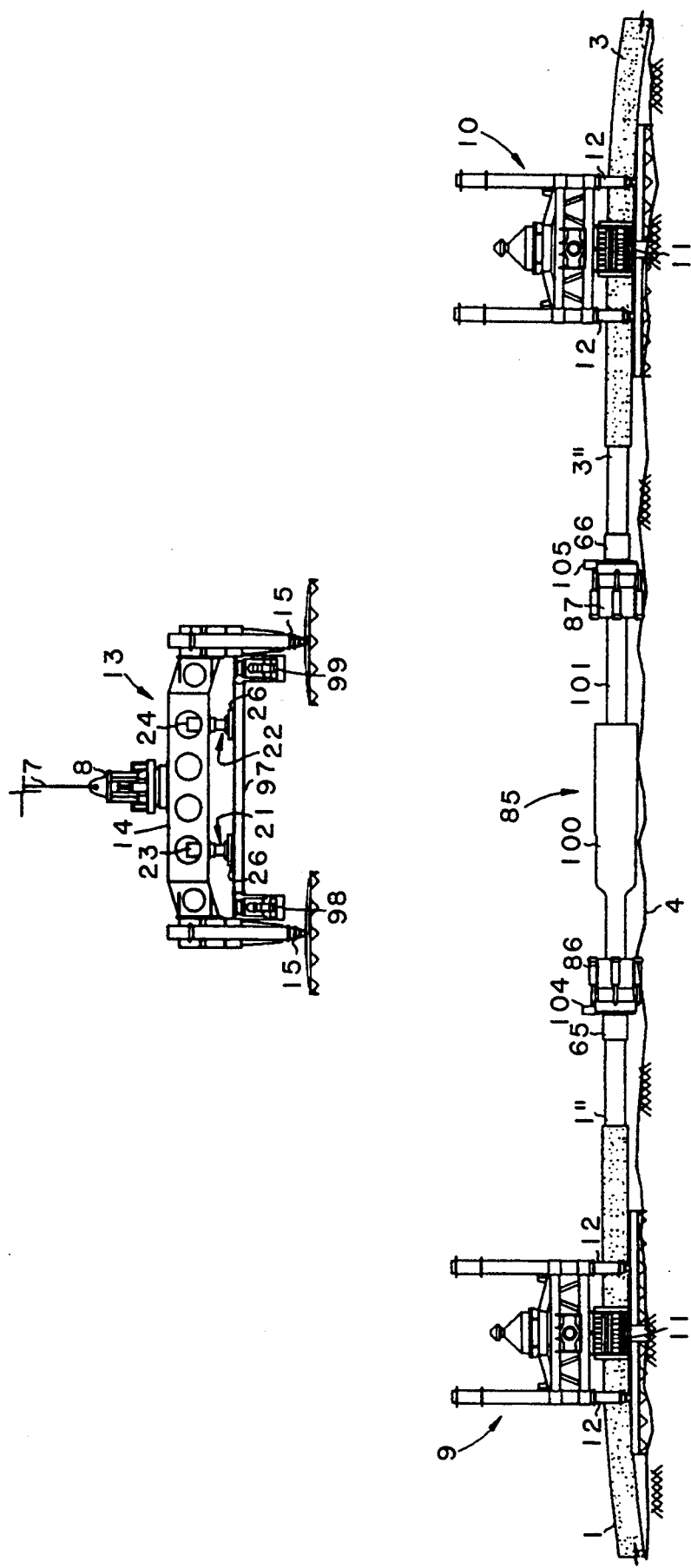

METHOD FOR AUTOMATICALLY REPAIRING UNDERWATER PIPELINES, PARTICULARLY SUITABLE FOR GREAT DEPTHS, AND THE RELATIVE APPARATUS

This invention relates to a new method by which, in situ and without the use of divers or other personnel operating at depth, the damaged pipe piece can be cut away, the weighting concrete be removed by a cutter automatically centered about the pipeline axis by an expansion-centering head, the end connectors be guidedly installed by means of an alignment apparatus, and the replacement piece be installed with the aid of an appropriate reference and guide apparatus, all effected by a single working module to which the appropriate apparatus is connected at the required time, resulting in effective, easy and economical in-situ repair of a pipeline even lying at great depth, whatever the length of its damaged part.

The invention also relates to certain specific apparatus for implementing said method.

Various methods are already known in the art for repairing underwater pipelines.

One of the currently most used methods, especially for low and medium depths, is that based on hyperbaric welding which, however, is substantially very laborious and costly because it requires the use of immersed personnel for a considerable time, with related operability and safety problems. Again, such welding can only be effected satisfactorily to a maximum depth of the order to 200 meters both because of problems involved in the welding itself and because of problems concerning the operating capacity of the personnel, which is considerably reduced under the excessive external pressure.

Because of this there is a need for an alternative repair method able to overcome the depth barrier while ensuring the same operating reliability, ie a method which instead of welding uses a mechanical joint formed by connectors, which are fixed to the facing ends of the previously cut pipeline by an expansion method. Because of its quick installation and hence its economy, a mechanical joint is currently ueesd at low depths for small-diameter pipelines, where the installation can be easily done directly by divers because of the small weights to be handled. It is also known in the state of the art to apply a mechanical joint by a repair method for great-depth pipelines without the use of immersed personnel.

In this latter known repair method the cut ends of the pipeline to be repaired have to be brought to the surface by a ship specifically equipped for this recovery, in order to be able both to remove the weighting concrete and to suitably machine the edge parts of said ends so that they can be fitted to the end connectors, with obvious consequent considerable operating complications and high operating costs due to the use of a special ship and the need to empty the pipeline to enable it to be raised.

The object of the present invention is to obviate said drawbacks by providing a method which allows easy and relatively low-cost automatic in-situ repair of an underwater pipeline, and hence without raising it to the surface, even if installed at great depth, by a ship equipped with a simple crane.

This is made possible in that the removal of the concrete without harming the outer surface of the pipeline, the installation and fixing of the connectors to the cut ends of the pipeline and the installation of the replacement pipe piece of variable length are done in situ and hence at depth in a completely automatic manner by a single working module which, controlled and remotely guided from the surface, also cuts off the damaged piece of the pipeline. More specifically, the concrete is removed by a removal apparatus comprising a cutter slidable along a circumferential guide which is itself slidable along a longitudinal side, said apparatus being supported longitudinally slidable by said working module and being provided with an expansion-centering head which, when inserted into the pipeline to be repaired, enables the cutter to be exactly positioned about the pipeline axis and hence ensures that only the concrete is removed without any possibility of the cutter harming the outer surface of the pipeline.

The connectors are installed on the cut ends of the pipeline by a sonar head alignment apparatus which, movably supported by said working module, controls the hydraulic actuators of said working module so that the connector and pipeline are maintained coaxial until the connector has been completely mounted, said alignment apparatus also being provided with means for fixing said connectors in position.

The replacement pipe piece, of telescopically variable length, is easily installed with the aid of two identical reference and guide apparatus which compel said working module to assume the required position, said apparatus enabling replacement pieces of any length to be applied.

Finally, said working module is provided at its ends with legs independently adjustable telescopically so that the module can be raised and levelled if the sea bed is irregular, and further provided with two easily removable outer swivel clamps fitted with instruments allowing measurement of the inclination of the clamps to the working module, said clamps being able to fix the module to the pipeline to be repaired and render it precisely parallel thereto, and with two hydraulically operated internal quick-coupling systems movable hydraulically in a vertical direction, for fixing the various working apparatus and for fixing the replacement pipeline piece, said internal systems being provided with hydraulic members for horizontally moving said apparatus, including also that for cutting the damaged pipe piece and consisting of two small internal clamps, each acting as a support for its own cutting tool such as a diamond-set cable saw allowing easy simultaneous cutting both of the pipeline and of its concrete covering.

The reason for the presence of two further clamps inside the module and of two cutting tools in said cutting apparatus is that if the damaged pipe piece to be removed is shorter than the distance between the two cutting tools, not only can said piece be cut off in one operation without having to remove the working module, but the cut-off piece which remains clamped between said small internal clamps can be recovered, this being essential to prevent said piece interfering with subsequent operations and to identify on the cut cross-section of said piece any constructional irregularities which could be very important for the proper centering of the relative apparatus during the subsequent concrete removal and connector installation.

However, said cutting apparatus can also be used if the pipe piece to be removed is longer than said distance between the two cutting tools. In this case the first cut is made after positioning the working module for example upstream of the damaged piece and tightening the four clamps, that cutting tool situated more upstream of said damaged piece being used; after cutting, said four clamps are opened and the working module is positioned downstream of the damaged piece, at the point of the second cut; after re-tightening the four clamps the cut is made using that tool which is more downstream of said damaged piece. When the cut has been made the external clamp situated close to the second cut is then completely opened so that the cut pipe piece remains clamped by the other external clamp and by the two small internal clamps, and can hence be brought to the surface together with the working module.

Hence, the method, using a crane-equipped depot ship, for automatically repairing an underwater pipeline even if installed at great depth, comprising lowering onto the sea bed by said crane, using a cable provided with a quick coupling/uncoupling device, a support frame provided with a gripping clamp and telescopically adjustable legs, tightening said support frame clamp about said pipeline for example upstream of its damaged piece, raising the pipeline into the predetermined position by operating said legs of said frame and uncoupling said cable by operating its quick coupling-/uncoupling device, then repeating all said steps for raising said pipeline into the predetermined position by a second support frame clamped downstream of said damaged pipe piece, and cutting off the damaged pipe piece, then lowering two connectors onto the sea bed, mounting and fixing them on the facing ends of the cut pipeline, lowering the replacement pipe piece and installing it by locking it into said previously installed connectors, repositioning the thus repaired pipeline on the sea bed, retracting the legs, opening the clamps of said support frames and recovering the utilized apparatus on board said depot ship, is characterised according to the present invention in that said cutting of the damaged pipe piece is achieved by lowering onto the sea bed, using said cable provided with a quick coupling-/uncoupling device, a working module provided at its ends with legs telescopically adjustable independently of each other, with two outer removable swivel clamps fitted with instruments, and with two vertically movable internal quick-coupling systems each provided with at least one horizontal operating means and to which there has been fixed a cutting apparatus consisting of two small internal clamps each acting as a support for its own cutting tool, then positioning said working module along the pipeline so that the damaged pipe piece lies between said two cutting tools of said cutting apparatus, clamping said external clamps of said working module about said pipeline, resting the working module on the sea bed by suitably elongating its telescopic legs, setting said module parallel to the pipeline by acting on said independently adjustable legs on the basis of the information provided by the instruments on said external clamps, then vertically lowering said internal clamps of said cutting apparatus and clamping them about said pipeline, cutting through said damaged pipe piece using said cutting tools of said cutting apparatus, opening said external clamps of the working module and raising onto said depot ship the working module together with said damaged pipe piece clamped between said internal clamps of said cutting apparatus; said lowering of two connectors onto the sea bed and their mounting and fixing on the facing ends of the cut pipeline are achieved by lowering onto the sea bed, using said cable provided with the quick coupling/uncoupling device, said working module to the two said internal quick-coupling systems of which there has been fixed a longitudinal guide for a concrete removal apparatus consisting of a cutter slidable along a circumferential guide, itself slidable along a second longitudinal guide, and an expansion-centering head coaxial with said circumferential guide, positioning said working module on one of the two facing ends of the cut pipeline so that said centering head faces and is in proximity to the edge of said end, clamping the relative external clamp of said working module about said end, resting the working module on the sea bed by suitably elongating its telescopic legs, setting said module parallel to said end by acting on said independently adjustable legs on the basis of the information provided by the instruments on said external clamps, sliding said concrete removal apparatus along said longitudinal guide fixed to said internal quick-coupling systems of said working module until said centering head has been completely inserted in said end of the cut pipeline, expanding said centering head until it presses symmetrically against the inner surface of said pipeline end, longitudinally advancing said cutter along said second guide for the entire length of the guide so as to longitudinally groove the concrete along the lower generator of the pipeline end, rotating said cutter along said circumferential guide to circumferentially groove the concrete, longitudinally withdrawing said cutter to its initial position to longitudinally groove the concrete along the upper generator of said pipeline end so that the concrete of said end separates in the form of two blocks, closing said centering head and extracting it from the pipeline, opening said external clamp of the working module, raising said working module onto said depot ship, re-lowering onto the sea bed said working module, to the two said internal quick-coupling systems of which there has now been fixed a longitudinal guide for a sonar head alignment apparatus coaxially carrying a connector and means for fixing said connector in position, positioning said working module on said pipeline end from which the concrete has previously been removed so that said sonar head faces and is in proximity to said edge of said end, clamping the relative external clamp of said working module about said concrete-free end at a distance from said end edge which is greater than the length through which said connector is mounted, resting the working module on the sea bed by suitably elongating its telescopic legs, setting said module parallel to said end by acting on said independently adjustable legs on the basis of the information provided by the instruments on said external clamps, advancing said sonar head alignment apparatus along said longitudinal guide until said sonar head is completely inserted in said pipeline end, continuing said advancement until said connector is completely mounted on said concrete-free end, coaxially between the pipeline and said alignment apparatus being continuously ensured by said sonar head, which governs the actuation of said vertical and horizontal operating means of said two internal quick-coupling systems of said working module, operating said means for fixing said connector in position, extracting said alignment apparatus, now connector-free, from said pipeline end, opening said external clamp of the working module, raising said working module onto said depot ship and repeating all said operations for fixing the other connector onto the facing end of the cut pipeline; said lowering of the replacement pipe piece and its installation by locking it into said previously installed connectors is achieved by lowering from said depot ship, using said cable provided with the quick coupling-/uncoupling device, a reference and guide apparatus consisting substantially of a stand provided with a tightening clamp, telescopic legs and a horizontally movable slide to which a vertical reference cone and a stop device are fixed, clamping said clamp of said stand about one of the concrete-free facing ends of the cut pipeline in proximity to the relative previously fixed connector, resting said stand on the sea bed by suitably elongating its telescopic legs, moving said slide until said stop device abuts against the edge of said connector projecting from the surface of said end, repeating all said operations for a second reference and guide apparatus to be positioned on the other concrete-free end of the cut pipeline, lowering onto the sea bed, using said cable provided with the quick coupling/uncoupling device, said working module from which said external clamps have been removed and to the two internal quick-coupling systems of which there has been fixed a further longitudinal guide along which there can slide two support clamps clamped about the telescopic elements of the replacement pipe piece which is provided at its ends with means for its coupling to said connector and with two automatically releasable guide rings arranged to cooperate with said two vertical reference cones of said reference and guide apparatus, mounting said guide rings onto the respective vertical reference cones, resting the working module on the sea bed by suitably elongating its telescopic legs, continuing to lower said working module by adjusting its legs until said guide rings are automatically released by a counteracting member provided on said vertical reference cones, moving said two support clamps for said replacement pipe piece so as to telescopically elongate said piece until its ends are brought into contact with said connectors, operating said means for coupling said replacement pipe piece to said connectors, opening the clamps of said reference and guide apparatus and then opening said clamps supporting said replacement pipe piece.

According to a modification of the present invention, valid when the pipe piece to be removed is longer than the distance between the two cutting tools of said cutting apparatus, said cutting of the damaged pipe piece is achieved by lowering onto the sea bed, using said cable provided with a quick coupling/uncoupling device, a working module provided at its ends with legs telescopically adjustable independently of each other, with two outer removable swivel clamps fitted with instruments, and with two vertically movable internal quick-coupling systems each provided with at least one horizontal operating means and to which there has been fixed a cutting apparatus consisting of two small internal clamps each acting as a support for its own cutting tool, then positioning said working module along the pipeline on one side, for example upstream, of the damaged pipe piece, clamping said external clamps of said working module about said pipeline, resting the working module on the sea bed by suitably elongating its telescopic legs, setting said module parallel to the pipeline by acting on said independently adjustable legs on the basis of the information provided by the instruments on said external clamps, then vertically lowering said internal clamps of said cutting apparatus and clamping them about said pipeline, cutting through said damaged pipe piece using that cutting tool situated more upstream of said damaged piece, reopening both the external clamps and the internal clamps of the working module, raising said internal clamps and the legs of said module and positioning said module on the other side, ie downstream of said damaged pipe piece, clamping said external clamps of said module about the pipeline, again resting the working module on the sea bed by elongating its legs and again setting it parallel to the pipeline, then again lowering and clamping the internal clamps about said pipeline, cutting the pipeline a second time using the cutting tool situated more downstream of said damaged pipe piece, opening only the external clamp situated close to the second cut, and raising onto said depot ship the working module together with said damaged pipe piece clamped between said internal clamps of said cutting apparatus and the unopened external clamp of said working module.

According to a preferred embodiment of the present invention, said working module consists of a box beam provided at its corners with four vertical telescopic legs movable independently of each other, and provided on its short sides external to the module with two external clamps each hinged to a bracket removably fixed to the beam by bolts and centering pins and provided with an instrument for measuring their inclination to the vertical axis of the module, which is also provided with two quick-coupling systems mounted, vertically movable, on the pistons of two vertical hydraulic cylinders fixed to said box beam inwards of said legs, each system comprising a structure with a substantially C-shaped vertical lead-in for the connectors of the apparatus to be connected, said structure acting as a horizontal slide guide for two locking pins for said connectors of the apparatus to be connected, said pins being operated by two small horizontal hydraulic cylinders rigid with said structure and orientated in the same manner as the box beam, two further small hydraulic cylinders being fixed horizontally to said structure and lying perpendicular to said first small hydraulic cylinders. According to a further preferred embodiment of the present invention, said concrete removal apparatus consists of a slide guide longitudinally supported at the ends of two end hangers provided upperly with wheels for its sliding along a second longitudinal guide provided with connectors for connection to the quick-coupling systems of said working module, said first guide cooperating with a carriage driven by a hydraulic motor via a lead-screw and nut system and supporting at its lower end a circumferential guide for a slide driven by a hydraulic motor and on which there is fixed a milling cutter rotated by a hydraulic motor, an expansion-centering head being projectingly fixed on the lower end of one of said two end hangers, on the lower end of the other hanger there being mounted a saddle for resting on the pipeline and adjustably positionable by three hydraulic cylinders, the apparatus being moved along said second longitudinal guide by a hydraulic motor via a lead-screw and nut system.

Finally, according to a further preferred embodiment of the present invention, said sonar head alignment apparatus consists of a longitudinal hydraulic cylinder, the piston of which carries at its front end a sonar probe comprising two coaxial sensor rings arranged longitudinally at a known distance apart in order to measure any misalignment between the piston axis and the pipeline axis, and also coaxially supports both an end connector and said means for fixing said connector in position, these consisting essentially of a plug of elastic material mounted coaxially on said piston between a shoulder rigid with the piston and said hydraulic cylinder, which is mounted slidable along a longitudinal guide fixed to said quick-coupling systems of said working module, the vertical and horizontal cylinders of which are operated to compensate said measured misalignment.

The invention is further described hereinafter with reference to the accompanying drawings, which show preferred embodiments thereof by way of non-limiting example only, in that technical or constructional modifications can be made thereto without leaving the scope of the present invention.

In said drawings:

FIG. 7 is a side view to a highly enlarged scale showing the removal, in accordance with the method of the present invention, of the concrete from the end of the cut pipeline;

FIGS. 12, 13 and 14 are side views showing the installation of the replacement pipe piece in accordance with the method of the present invention, in which:

FIG. 12 shows the locking of a reference and guide apparatus on the concrete-free cut end of the pipeline;

FIG. 13 shows the guiding into position of the working module supporting the replacement pipe piece;

FIG. 14 shows the installation of the replacement pipe piece;

FIG. 15 shows the repositioning of the repaired pipeline on the sea bed and the recovery of the working module, in accordance with the method of the present invention.

Figure 1:
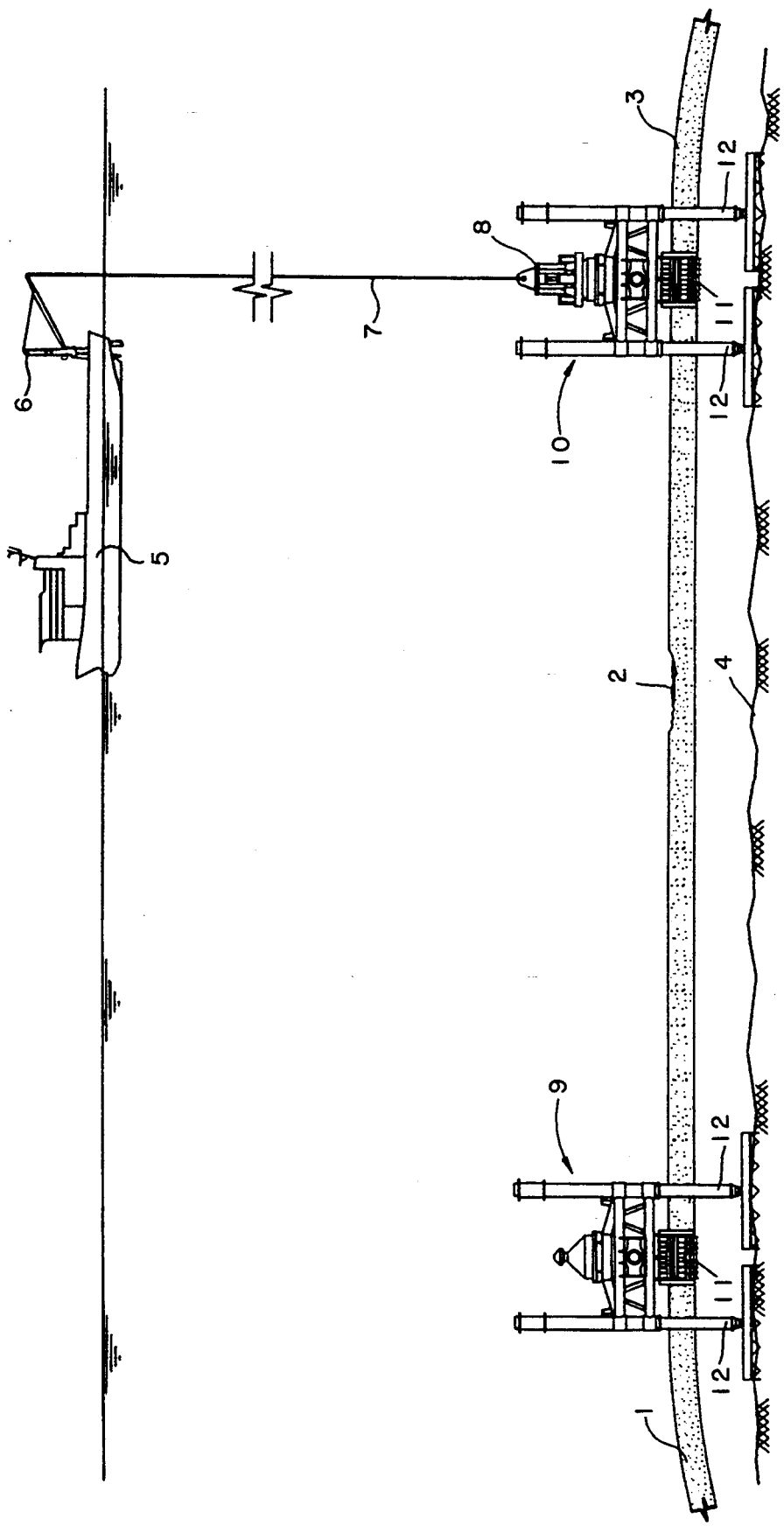
FIG. 1 is a side view showing the supporting, in accordance with the method of the present invention, of a pipeline to be repaired.

In the figures the reference numeral 1 indicates that part of the pipeline lying upstream of its damaged piece 2, and 3 indicates that part downstream thereof.

To maintain the pipeline raised from the sea bed 4 and to support it in position after the damaged piece 2 has been removed, a depot ship 5 provided with a crane 6 lowers two support frames 9 and 10 onto the sea bed 4 by means of a cable 7 provided with a quick-coupling 8. Said support frames 9 and 10 are locked by means of their clamp 11 about said parts 1 and 3 of the pipeline respectively, and raise the pipeline to the required height by means of their telescopic legs 12.

All the subsequent underwater operations are effected by a single working module 13 consisting of a box beam 14 supported at its four corners by four telescopic legs 15 (only two can be seen in the figures, these masking the other two to the rear) which can be elongated independently of each other in order to raise and level the module even if the sea bed is irregular. Depending on the operation to be performed by the module, one or two clamps 16 and 17 can be installed external to the module 13 on the short sides of the structure, in order to fix the module to the pipeline in precisely defined relationship. Said external clamps 16 and 17 can be easily removed from and reinstalled on the module 13 as they are each hinged to their own bracket 18, which is removably fixed to said beam 14 by bolts 19 and centering and reference pins, not shown in the figures. Each external clamp 16 and 17 is provided with an instrument 20 for measuring the inclination of the clamp to the module, hence enabling the pipeline to be easily set parallel to said box beam 14 of the module. Finally, the working module 13 is provided, inwards of said legs 15, with two quick-coupling systems 21 and 22 which can be moved vertically by two vertical hydraulic cylinders 23 and 24 respectively, which are fixed to said beam 14 and have their pistons 25 rigid with said systems (see specifically FIG. 7). Each quick-coupling system 21 and 22 comprises a structure 26 with a C-shaped vertical lead-in into which the connectors of the apparatus to be connected are inserted and are maintained in position by two locking pins 27 and 28 operated by two small horizontal hydraulic cylinders 29 and 30 rigid with said structure 26 and orientated in the same direction as the box beam 14 (again see FIG. 7). To said structure 26 there are also fixed two further small horizontal hydraulic cylinders 31, 32 positioned perpendicular to the small cylinders 29 and 30. In this manner the connected apparatus can be moved not only vertically by said cylinders 23 and 24, but also horizontally by said small cylinders 29 and 30, hence by suitably combining said vertical and horizontal movements coaxially can be achieved between the pipeline and the connected apparatus without the need to shift the legs 15 of the module 13.

Figure 2:
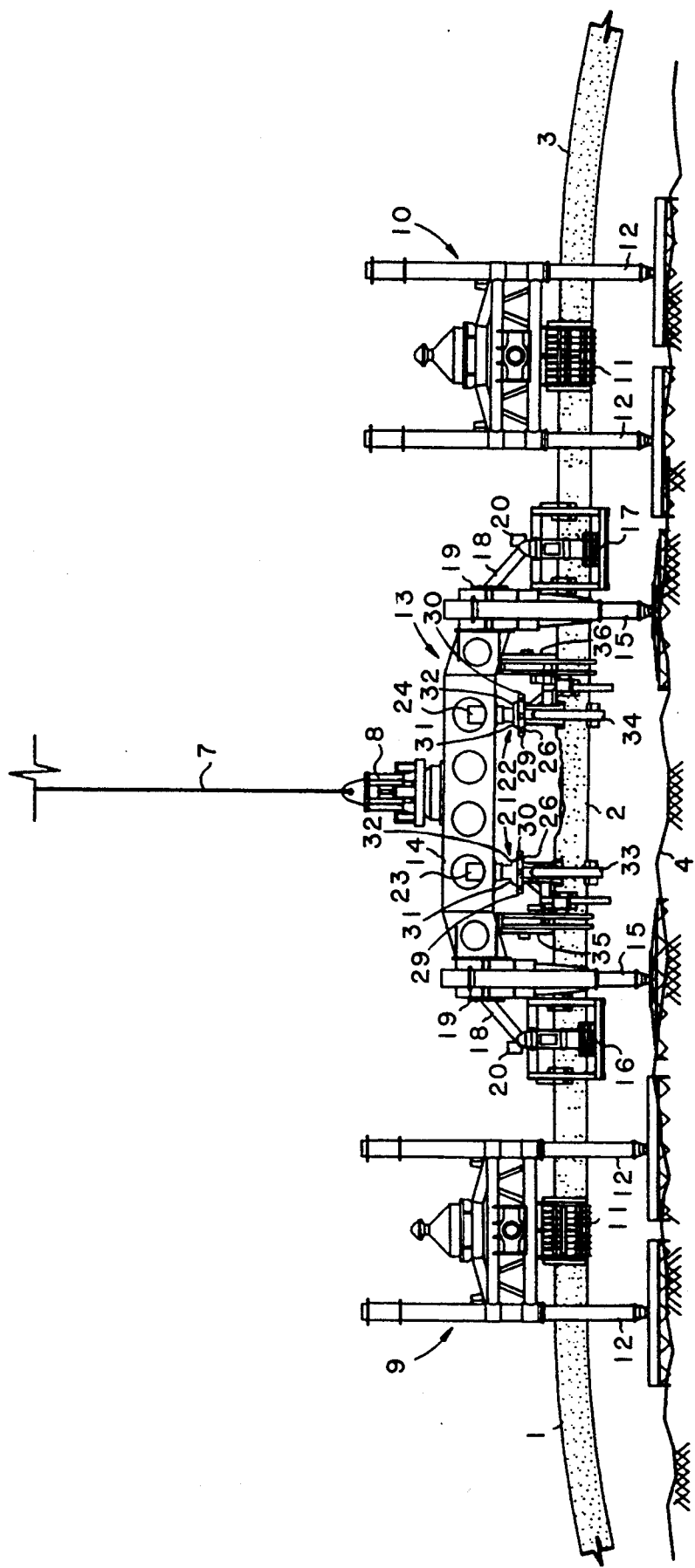
FIG. 2 is a side view showing the cutting, in accordance with the method of the present invention, of the pipeline to be repaired.
Figure 3:
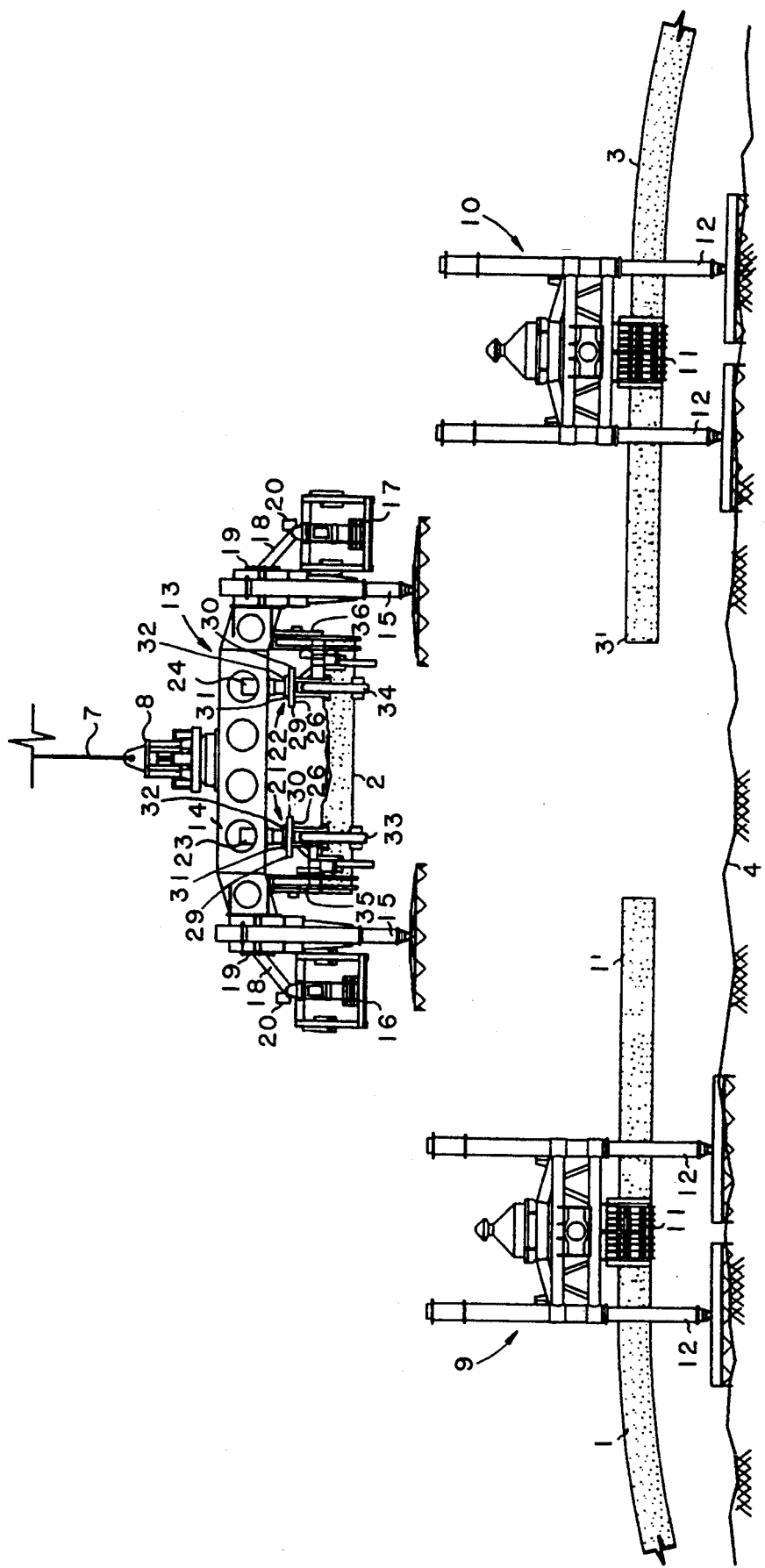
FIG. 3 is a side view showing the recovery, in accordance with the method of the present invention, of the working module and the damaged pipe piece.

The first operation to be effected is to cut off the damaged pipe piece 2 (see specifically FIGS. 2 and 3). For this purpose, to said quick-coupling systems 21 and 22 of the working module 13, in this case provided with both external clamps 16 and 17, there is fixed a cutting apparatus consisting of two small internal clamps 33 and 34, which are supported by said systems 21 and 22 and each act as a support for its own cutting tool 35 and 36.

Hence by positioning the working module 13, equipped in this manner, such that the damaged pipe piece 2 lies between said cutting tools 35 and 36, said piece 2 can not only be cut off in a single operation without having to shift the working module 13, but can also be immediately raised to the surface as it remains clamped by said internal clamps 33 and 34.

Figure 4:
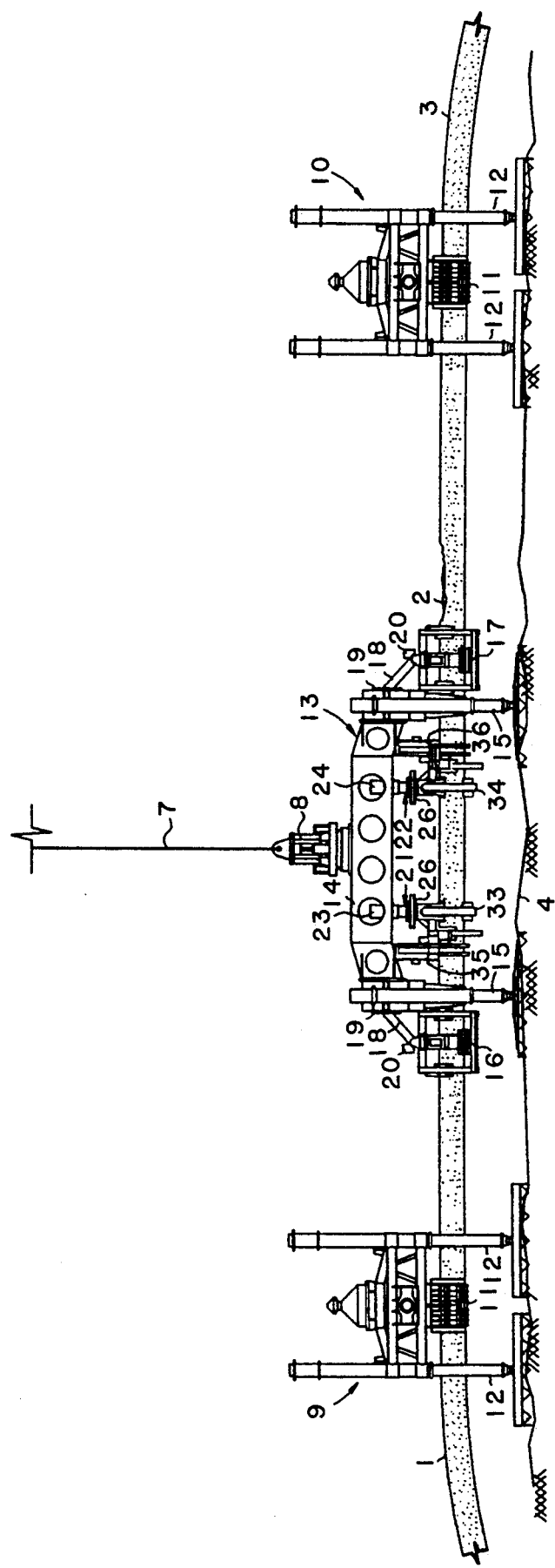
FIGS. 4, 5 and 6 show the cutting and recovery of the damaged pipe piece, in accordance with a modified embodiment of the present invention.
Figure 5:
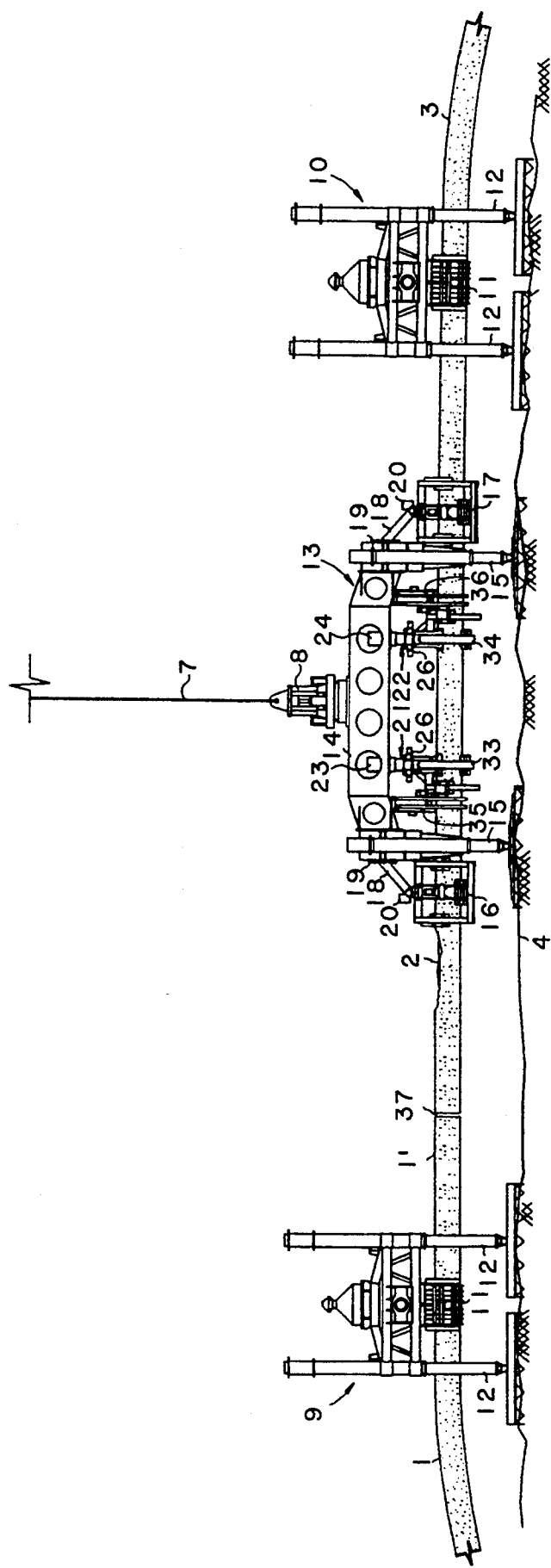
Figure 6:
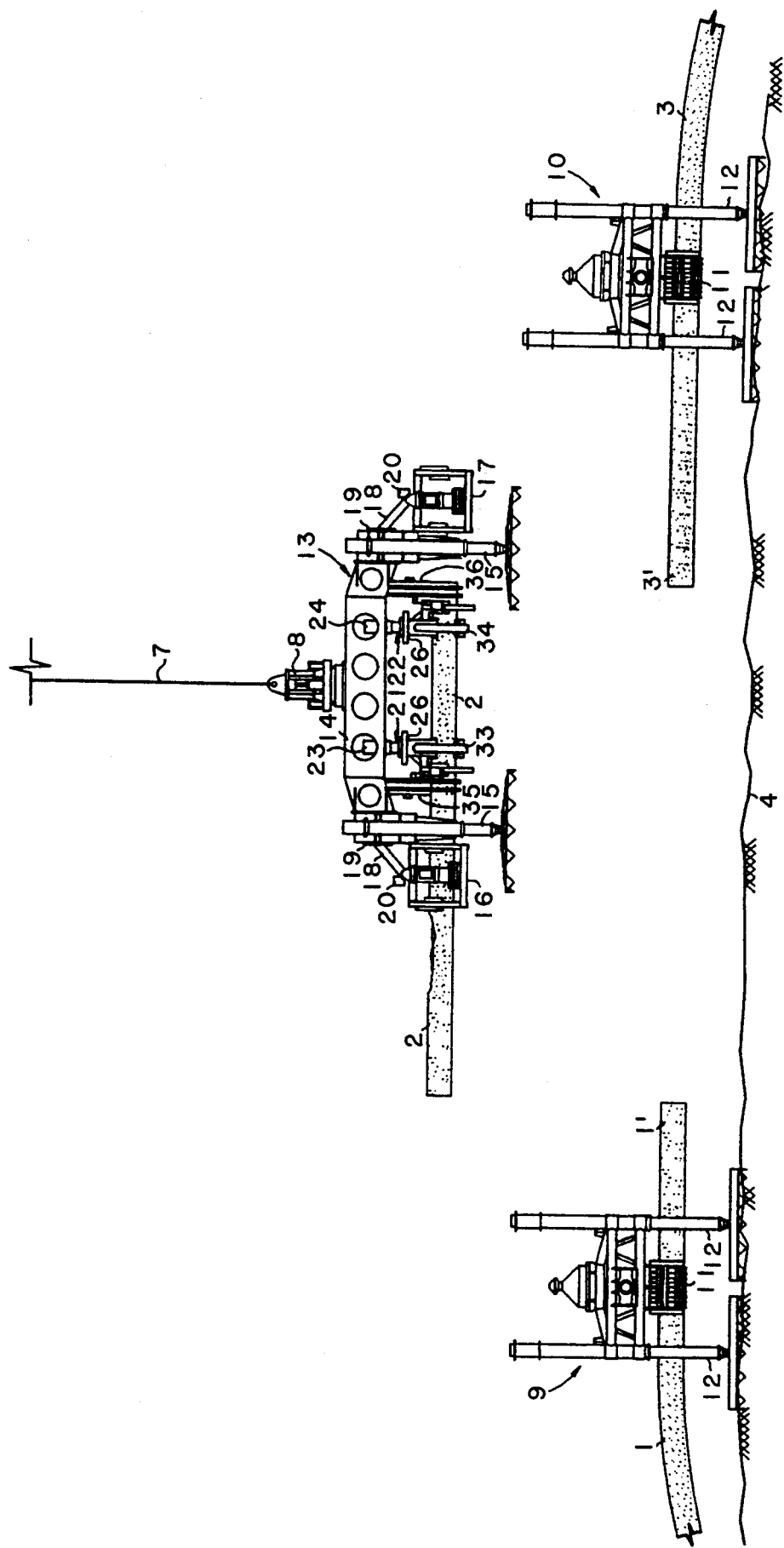

If however the length of the damaged pipeline piece 2 is greater than the distance between the two said cutting tools 35 and 36, the cutting operation is performed in accordance with the modification of the invention shown in FIGS. 4, 5 and 6.

In other words, the working module 13 together with its cutting apparatus is firstly positioned for example upstream of the damaged piece 2 (see specifically FIG. 4) and the pipeline is cut through at 37 (see specifically FIG. 5) using that cutting tool 35 situated more upstream of said damaged piece 2; after this the module 13 is repositioned downstream of said damaged piece 2 and the second cut is made with that cutting tool 36 situated more downstream of said damaged piece 2, the cut-off piece 2 then being immediately raised as it remains clamped by the clamps 16, 33 and 34.

Figures 8, 9:
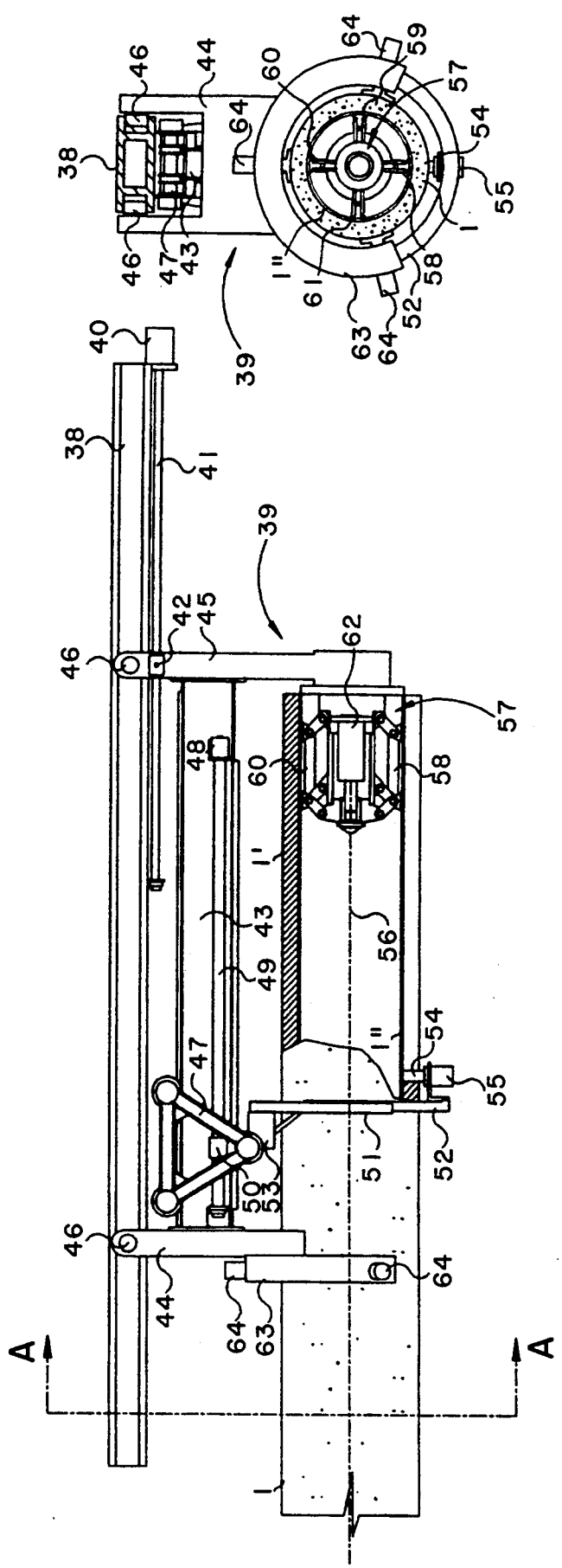
FIG. 8 is a partly sectional side view to a further enlarged scale, showing the concrete removal apparatus of FIG. 7 during the longitudinal grooving of the concrete along the lower generator of the end of the pipeline, in accordance with the method of the present invention.
FIG. 9 is a front view on the line AA of FIG. 8.

To remove the concrete from the facing ends 1' and 3' of the cut pipeline, to said quick-coupling systems 21 and 22 of the working module 13, now provided with only one external clamp 16 or 17, there is fixed a longitudinal guide 38 (see specifically FIGS. 7, 8 and 9) along which the concrete removal apparatus 39 can slide driven by a hydraulic motor 40 which is rigid with the guide 38 and operates a system comprising a lead-screw 41 and a nut 42. Said apparatus 39 consists of a longitudinal slide guide supported at its ends by two end hangers 44 and 45 provided upperly with support wheels 46 for their sliding along said guide 38. Said longitudinal guide 43 cooperates with a carriage 47 driven by a hydraulic motor 48 which is rigid with the guide 43 and operates a second system comprising a lead-screw 49 and nut 50 rigid with said carriage 47. Said carriage 47 supports at its lower end a circumferential guide 51 for a circumferential slide 52 driven by a hydraulic motor 53 rigid with the guide 51 and supporting a milling cutter 54 rotated by a hydraulic motor 55 rigid with said slide 52.

In order for the cutter to be able to remove the concrete without ever harming the metal surface or the anti-corrosive coating 1" or 3" of the pipeline and without having to make the cutter undergo radial corrective movements, the cutter 54 must be set coaxial to the pipeline axis 56 (see FIG. 8), this being achieved by an expansion-centering head 57 projectingly fixed to the lower end of said end hanger 45, to which said nut 42 is also fixed. Said expansion-centering head 57 consists substantially of four articulated parallelograms 58, 59, 60 and 61, expandable by a hydraulic cylinder 62. Finally, on the lower end of the other hanger 44 there is mounted a saddle 63 which is rested against the pipeline by three hydraulic cylinders 64.

Said centering head 57 is inserted into the end 1' or 3' of the pipeline by moving the entire apparatus 39 along the guide 38 and is then expanded against the inner surface of said end 1' or 3', after which the concrete is removed by longitudinally advancing said milling cutter 54, rotated by the motor 55, along the lower generator of said end 1' or 3' by means of the motor 48 for the entire length of the guide 43, then rotating said milling cutter 54 along the circumferential guide 51 by the motor 53 and finally withdrawing it along the upper generator of said end 1' or 3' by means of said motor 48. In this manner the concrete of said end 1' or 3' becomes detached in the form of two blocks.

Figure 10:
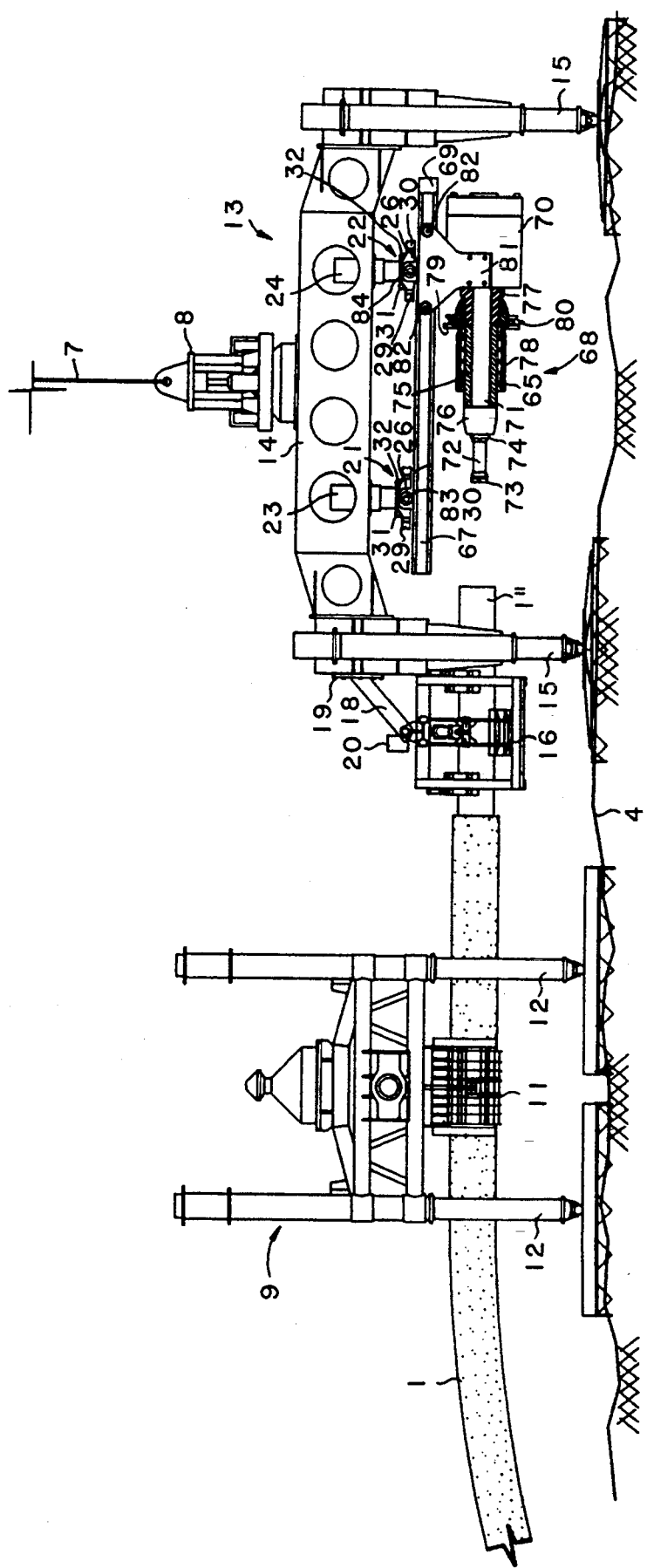
FIG. 10 is a side view to an enlarged scale showing the centered mounting of a connector on the cut end of the pipeline and its fixing in position, in accordance with the method of the present invention.
Figure 11:
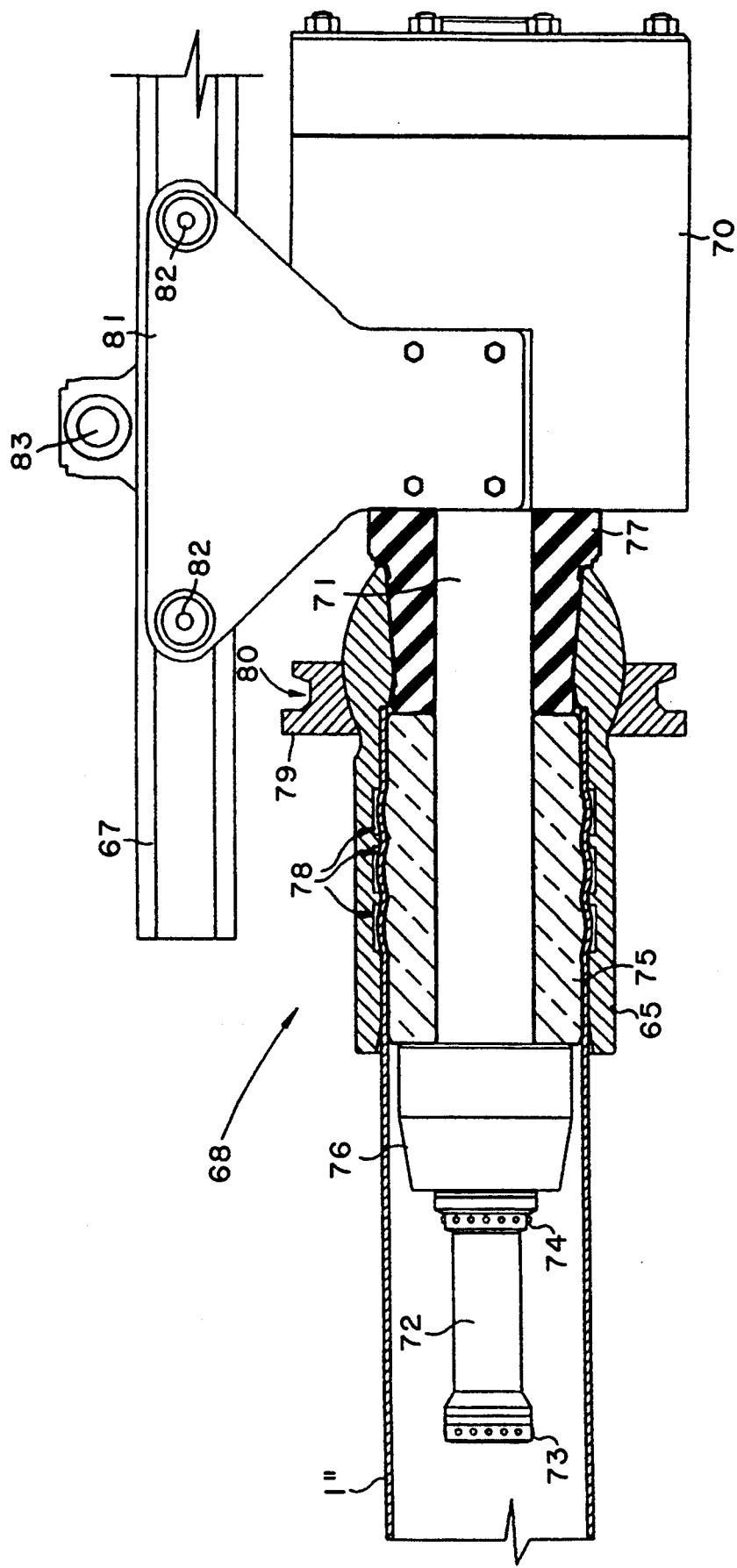
FIG. 11 is a partly sectional side view to a highly enlarged scale showing the sonar head apparatus of FIG. 10 during the fixing of the connector in position in accordance with the method of the present invention.
Figure 12:
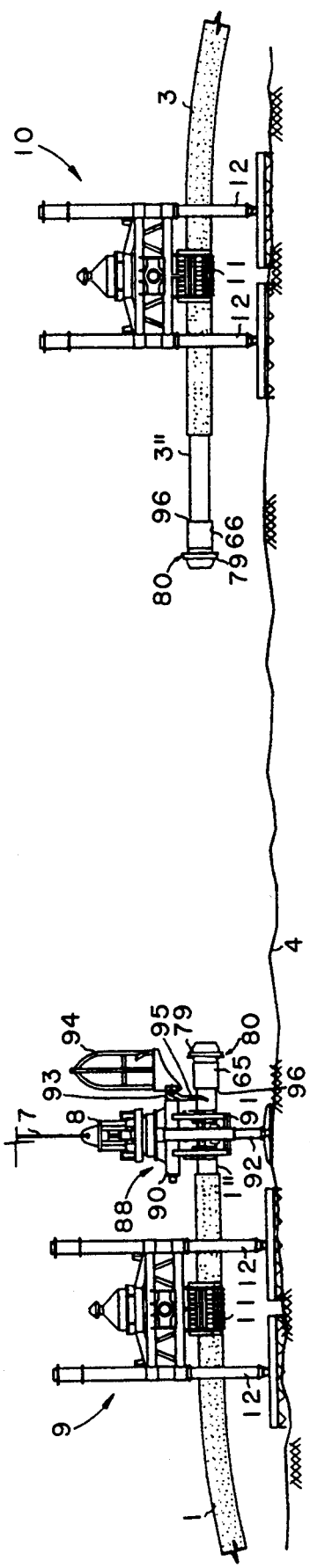
Figure 13:
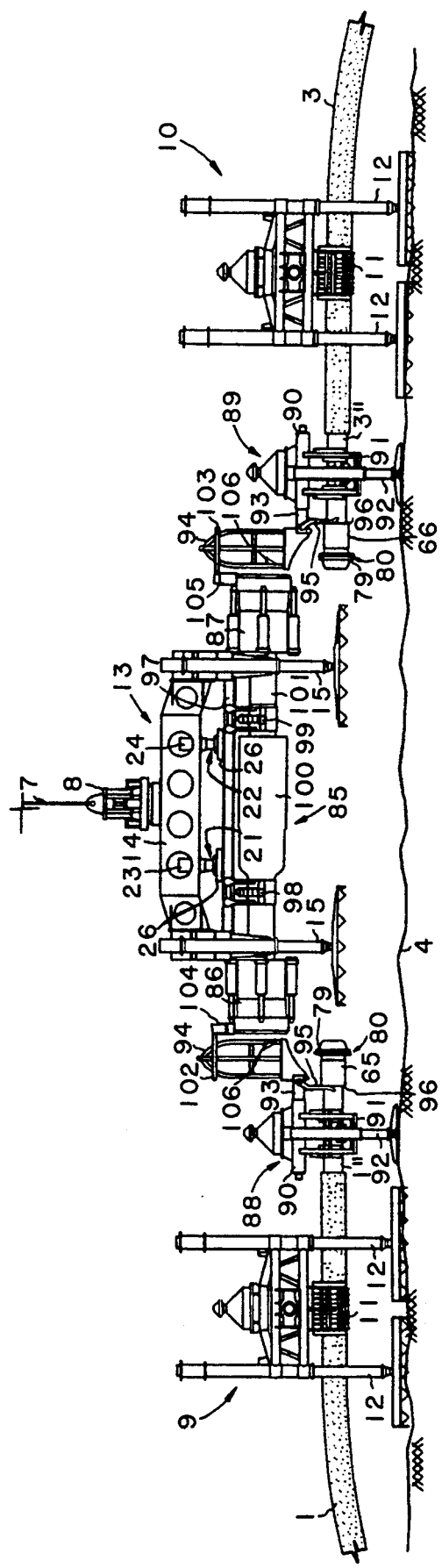
Figure 14:
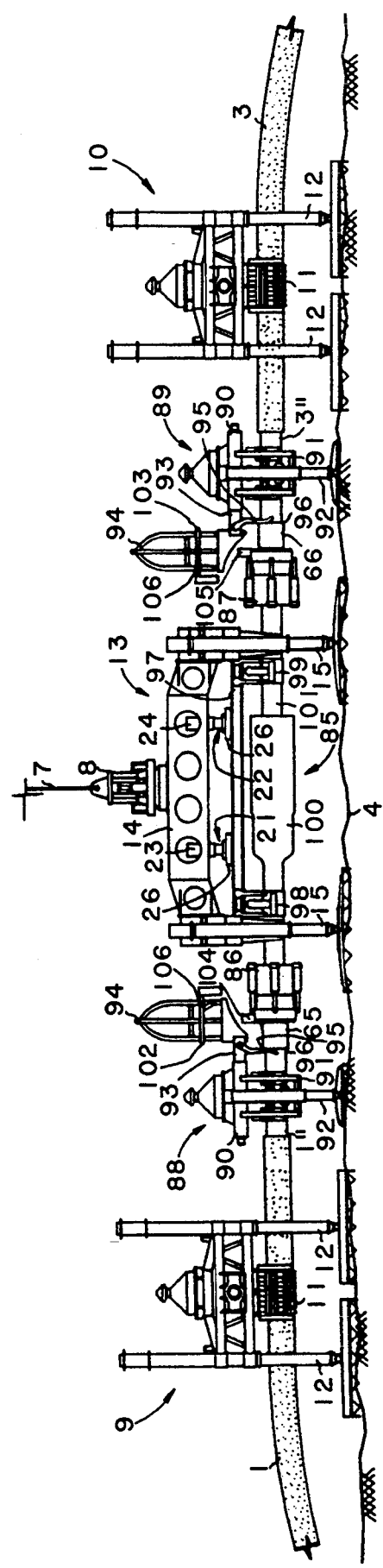

After removing the concrete, the end connectors 65 and 66 are mounted on the cleaned ends 1" and 3" of the pipeline. This operation is extremely delicate in that it requires substantially extremely precise insertion of the concrete-free pipeline end 1" or 3" into the extremely narrow interspace between the connector 65 or 66 and the means for fixing it in position, this requiring continuous and precise checking of the coaxially between said connector 65 or 66 and said end 1" or 3" to prevent undesirable jamming and forcing between said elements which, in addition to hindering insertion, could also damage the elements themselves. For this purpose, said quick-coupling systems 21 and 22 of said working module 13, still provided with only one external clamp 16 or 17, are fitted with the connectors 83 and 84 of a longitudinal guide 67 (see specifically FIGS. 10 and 11) along which the sonar head alignment apparatus 68 can slide driven by a hydraulic motor 69 which is rigid with the guide 67 and operates a lead-screw and nut system, not shown in the figures. Said apparatus 68 consists of a longitudinal hydraulic cylinder 70, the piston 71 of which carries at its front end said sonar head 72 comprising two coaxial rings of sensors 73 and 74 arranged at a known longitudinal distance apart in order to measure the misalignment between the axis of the piston 71 and the axis of the pipeline end 1" or 3". In this respect, each ring of sensors 73 and 74 provides substantially a circumferential series of radial measurements of the distance between the centre of the ring and the inner wall of the pipeline end 1" or 3", to hence detect any deviation between the theoretical centre of the cross-section of the pipeline end 1" or 3" and the centre of the ring of sensors 73 and 74. As this deviation is measured at two cross-sections a known distance apart, the misalignment between the axis of the end 1" or 3" and the axis of the sonar head 72 can be measured, this misalignment being continuously compensated by said vertical hydraulic cylinders 23 and 24 and horizontal hydraulic cylinders 31 and 32. Said piston 71 coaxially supports a plug 75 of elastic material mounted between a shoulder 76 rigid with the piston 71 and a conical ring 77 which is mounted coaxially to said piston 71 and is fixed to said hydraulic cylinder 70, and acts as an insertion support for said connector 65 or 66 which is arranged coaxially both to the piston 71 and to the sonar head 72, and comprises internal circumferential recesses 78 (see specifically FIG. 11) and a movable locking flange 79 provided with circumferential grooves 80.

Finally, said hydraulic cylinder 70 is provided with hangers 81 (only one can be seen in the figure, the other being to the rear), the wheels 82 of which cooperate with said longitudinal guide 67. The connectors 65 and 66 are then installed on the free ends 1" and 3" of the pipeline by inserting the sonar head 72 into the end of the pipeline and gradually continuing the insertion until the connector 65 or 66 has been completely inserted, while continuously correcting any detected misalignment by means of the hydraulic cylinders of the quick-coupling systems 21 and 22 of said working module 13. The piston 71 is then withdrawn with consequent radial expansion of the elastic plug 75, so plastically deforming the cleaned end 1" or 3" into said recesses 78 of the connector 65 or 66, which hence remains locked in position with an ensured hydraulic seal.

Finally, to install the replacement pipe piece 85, said piece 85 must be in perfect alignment with said connectors 65 and 66 already fixed to the free ends 1" and 3" of the pipeline, ie said piece 85 must be guided into the ideal position for the coupling means 86 and 87 situated at its ends to be able to cooperate with said circumferential grooves 80 in the movable locking flanges 79 of said connectors 65 and 66.

For this purpose two reference and guide apparatus 88 and 89 are used, each consisting of a stand 90 (see specifically FIGS. 12, 13, 14 and 15) provided with a clamp 91 for clamping about the cleaned ends 1" and 3" of the pipeline in proximity to said already installed connectors 65 and 66, and further provided with telescopic legs 92 to be elongated onto the sea bed 4 to support said ends 1" and 3" in a horizontal position so releasing them from the weight of the installed connectors, and with a slide 93 slidable horizontally to move a vertical reference and guide cone 94 rigid therewith into a predetermined position defined by a stop device 95 cooperating with the edge 96 of said connectors 65 and 66.

The quick-coupling systems 21 and 22 of said working module 13, in this case without either external clamp 16 and 17, are now fitted with a longitudinal guide 97 (see specifically FIGS. 13 and 15) along which there can slide two support clamps 98 and 99 clamped about the constituent telescopic elements 100 and 101 of said replacement pipe piece 85 which in addition to said coupling means 86 and 87 also comprises at its ends two guide rings 102 and 103 which are simply inserted into guides, 104 and 105 respectively, rigid with said coupling means 86 and 87 and are automatically released by an abutment 106 provided on said vertical reference cones 94 with which they cooperate.

In this manner, mounting said guide rings 102 and 103 on said reference and guide cones 94 ensures correct positioning of the replacement piece 85, which on being telescopically elongated can be easily connected mechanically to said connectors 65 and 66 to restore continuity of the pipeline (see specifically FIG. 14), which can then be again rested on the sea bed 4 by retracting the legs 12 of said support frames 9 and 10 (see specifically FIG. 15 which also shows the raising to the surface of the working module 13), after raising to the surface all the apparatus used.

We claim:

1. A method, using a crane-equipped depot ship, for automatically repairing an underwater pipeline even if installed at great depth, comprising lowering onto the sea bed by said crane, using a cable provided with a quick coupling/uncoupling device, a support frame provided with a gripping clamp and telescopically adjustable legs, tightening said support frame clamp about said pipeline for example upstream of its damaged piece, raising the pipeline into the predetermined position by operating said legs of said frame and uncoupling said cable by operating its quick coupling/uncoupling device, then repeating all said steps for raising said pipeline into the predetermined position by a second support frame clamped downstream of said damaged pipe piece, and cutting off the damaged pipe piece, then lowering two connectors onto the sea bed, mounting and fixing them on the facing ends of the cut pipeline, lowering the replacement pipe piece and installing it by locking it into said previously installed connectors, repositioning the thus repaired pipeline on the sea bed, retracting the legs, opening the clamps of said support frames and recovering the utilized apparatus on board said depot ship, characterised in that said cutting of the damaged pipe piece is achieved by lowering onto the sea bed, using said cable provided with a quick coupling/uncoupling device, a working module provided at its ends with legs telescopically adjustable independently of each other, with two outer removable swivel clamps fitted with instruments, and with two vertically movable internal quick-coupling systems each provided with at least one horizontal operating means and to which there has been fixed a cutting apparatus consisting of two small internal clamps each acting as a support for its own cutting tool, then positioning said working module along the pipeline so that the damaged pipe piece lies between said two cutting tools of said cutting apparatus, clamping said external clamps of said working module about said pipeline, resting the working module on the sea bed by suitably elongating its telescopic legs, setting said module parallel to the pipeline by acting on said independently adjustable legs on the basis of the information provided by the instruments on said external clamps, then vertically lowering said internal clamps of said cutting apparatus and clamping them about said pipeline, cutting through said damaged pipe piece using said cutting tools of said cutting apparatus, opening said external clamps of the working module and raising onto said depot ship the working module together with said damaged pipe piece clamped between said internal clamps or said cutting apparatus; said lowering of two connectors onto the sea bed and their mounting and fixing on the facing ends of the cut pipeline are achieved by lowering onto the sea bed, using said cable provided with the quick coupling/uncoupling device, said working module to the two said internal quick-coupling systems of which there has been fixed a longitudinal guide for a concrete removal apparatus consisting of a cutter slidable along a circumferential guide, itself slidable along a second longitudinal guide, and an expansion-centering head coaxial with said circumferential guide, positioning said working module on one of the two facing ends of the cut pipeline so that said centering head faces and is in proximity to the edge of said end, clamping the relative external clamp of said working module about said end, resting the working module on the sea bed by suitably elongating its telescopic legs, setting said module parallel to said end by acting on said independently adjustable legs on the basis of the information provided by the instruments on said external clamps, sliding said concrete removal apparatus along said longitudinal guide fixed to said internal quick-coupling systems of said working module until said centering head has been completely inserted in said end of the cut pipeline, expanding said centering head until it presses symmetrically against the inner surface of said pipeline end, longitudinally advancing said cutter along said second guide for the entire length of the guide so as to longitudinally groove the concrete along the lower generator of the pipeline end, rotating said cutter along said circumferential guide to circumferentially groove the concrete, longitudinally withdrawing said cutter to its initial position to longitudinally groove the concrete along the upper generator of said pipeline end so that the concrete of said end separates in the form of two blocks, closing said centering head and extracting it from the pipeline, opening said external clamp of the working module, raising said working module onto said depot ship, relowering onto the sea bed said working module, to the two said internal quick-coupling systems there is now fixed a longitudinal guide for a sonar head alignment apparatus coaxially carrying a connector and means for fixing said connector in position, positioning said working module on said pipeline end from which the concrete has previously been removed so that said sonar head faces and is in proximity to said edge of said end, clamping the relative external clamp of said working module about said concrete-free end at a distance from said end edge which is greater than the length through which said connector is mounted, resting the working module on the sea bed by suitably elongating its telescopic legs, setting said module parallel to said end by acting on said independently adjustable legs on the basis of the information provided by the instruments on said external clamps, advancing said sonar head alignment apparatus along said longitudinal guide until said sonar head is completely inserted in said pipeline end, continuing said advancement until said connector is completely mounted on said concrete-free end, coaxially between the pipeline and said alignment apparatus being continuously ensured by said sonar head, which governs the actuation of said vertical and horizontal operating means of said two internal quick-coupling systems of said working module, operating said means for fixing said connector in position, extracting said alignment apparatus, now connector-free, from said pipeline end, opening said external clamp of the working module, raising said working module onto said depot ship and repeating all said operations for fixing the other connector onto the facing end of the cut pipeline; said lowering of the replacement pipe piece and its installation by locking it into said previously installed connectors is achieved by lowering from said depot ship, using said cable provided with the quick coupling/uncoupling device, a reference and guide apparatus consisting substantially of a stand provided with a tightening clamp, telescopic legs and a horizontally movable slide to which a vertical reference cone and a stop device are fixed, clamping said clamp of said stand about one of the concrete-free facing ends of the cut pipeline in proximity to the relative previously fixed connector, resting said stand on the sea bed by suitably elongating its telescopic legs, moving said slide until said stop device abuts against the edge of said connector projecting from the surface of said end, repeating all said operations for a second reference and guide apparatus to be positioned on the other concrete-free end of the cut pipeline, lowering onto the sea bed, using said cable provided with the quick coupling/uncoupling device, said working module from which said external clamps have been removed and to the two internal quick-coupling systems of which there has been fixed a further longitudinal guide along which there can slide two support clamps clamped about the telescopic elements of the replacement pipe piece which is provided at its ends with means for its coupling to said connector and with two automatically releasable guide rings arranged to cooperate with said two vertical reference cones of said reference and guide apparatus, mounting said guide rings onto the respective vertical reference cones, resting the working module on the sea bed by suitably elongating its telescopic legs, continuing to lower said working module by adjusting its legs until said guide rings are automatically released by a counteracting member provided on said vertical reference cones, moving said two support clamps for said replacement pipe piece so as to telescopically elongate said piece until its ends are brought into contact with said connectors, operating said means for coupling said replacement pipe piece to said connectors, opening the clamps of said reference and guide apparatus and then opening said clamps supporting said replacement pipe piece.

2. A method for automatically repairing an underwater pipeline even if installed at great depth, as claimed in claim 1, characterised in that said cutting of the damaged pipe piece is achieved by lowering onto the sea bed, using said cable provided with a quick coupling-/uncoupling device, a working module provided at its ends with legs telescopically adjustable independently of each other, with two outer removable swivel clamps fitted with instruments, and with two vertically movable internal quick-coupling systems each provided with at least one horizontal operating means and to which there has been fixed a cutting apparatus consisting of two small internal clamps each acting as a support for its own cutting tool, then positioning said working module along the pipeline on one side, for example upstream, of the damaged pipe piece, clamping said external clamps of said working module about said pipeline, resting the working module on the sea bed by suitably elongating its telescopic legs, setting said module parallel to the pipeline by acting on said independently adjustable legs on the basis of the information provided by the instruments on said external clamps, then vertically lowering said internal clamps of said cutting apparatus and clamping them about said pipeline, cutting through said damaged pipe piece using that cutting tool situated more upstream of said damaged piece, reopening both the external clamps and the internal clamps of the working module, raising said internal clamps and the legs of said module and positioning said module on the other side, ie downstream of said damaged pipe piece, clamping said external clamps of said module about the pipeline, again resting the working module on the sea bed by elongating its legs and again setting it parallel to the pipeline, then again lowering and clamping the internal clamps about said pipeline, cutting the pipeline a second time using the cutting tool situated more downstream of said damaged pipe piece, opening only the external clamp situated close to the second cut, and raising onto said depot ship the working module together with said damaged pipe piece clamped between said internal clamps of said cutting apparatus and the unopened external clamp of said working module.

3. A method for automatically repairing an underwater pipeline even if installed at great depth, as claimed in claim 1, characterised in that said working module consists of a box beam provided at its corners with four vertical telescopic legs movable independently of each other, and provided on its short sides external to the module with two external clamps each hinged to a bracket removably fixed to the beam by bolts and centering pins and provided with an instrument for measuring their inclination to the vertical axis of the module, which is also provided with two quick-coupling systems mounted, vertically movable, on the pistons of two vertical hydraulic cylinders fixed to said box beam inwards of said legs, each system comprising a structure with a substantially C-shaped vertical lead-in for the connectors of the apparatus to be connected, said structure acting as a horizontal slide guide for two locking pins for said connectors of the apparatus to be connected, said pins being operated by two small horizontal hydraulic cylinders rigid with said structure and orientated in the same manner as the box beam, two further small hydraulic cylinders being fixed horizontally to said structure and lying perpendicular to said first small hydraulic cylinders.

4. A method for automatically repairing an underwater pipeline even if installed at great depth, as claimed in claim 1, characterised in that said concrete removal apparatus consists of a slide guide longitudinally supported at the ends of two end hangers provided upperly with wheels for its sliding along a second longitudinal guide provided with connectors for connection to the quick-coupling systems of said working module, said first guide cooperating with a carriage driven by a hydraulic motor via a lead-screw and nut system and supporting at its lower end a circumferential guide for a slide driven by a hydraulic motor and on which there is fixed a milling cutter rotated by a hydraulic motor, an expansion-centering head being projectingly fixed on the lower end of one of said two end hangers, on the lower end of the other hanger there being mounted a saddle for resting on the pipeline and adjustably positionable by three hydraulic cylinders, the apparatus being moved along said second longitudinal guide by a hydraulic motor via a lead-screw and nut system.

5. A method for automatically repairing an underwater pipeline even if installed at great depth, as claimed in claim 1, characterised in that said sonar head alignment apparatus consists of a longitudinal hydraulic cylinder, the piston of which carries at its front end a sonar probe comprising two coaxial sensor rings arranged longitudinally at a known distance apart in order to measure any misalignment between the piston axis and the pipeline axis, and also coaxially supports both an end connector and said means for fixing said connector in position, these consisting essentially of a plug of elastic material mounted coaxially on said piston between a shoulder rigid with the piston and said hydraulic cylinder, which is mounted slidable along a longitudinal guide fixed to said quick-coupling systems of said working module, the vertical and horizontal cylinders of which are operated to compensate said measured misalignment.

\* \* \* \* \*